United States Patent [19]

Nearhoff

[11] Patent Number: 5,140,943
[45] Date of Patent: Aug. 25, 1992

[54] FISH FEEDING APPARATUS

[76] Inventor: James W. Nearhoff, 15501 Pasadena Ave. #222, Tustin, Calif. 92680

[21] Appl. No.: 806,240

[22] Filed: Dec. 12, 1991

[51] Int. Cl.⁵ ............................................. A01K 61/02
[52] U.S. Cl. ............................... 119/51.04; 261/121.2; 119/51.11
[58] Field of Search ............... 119/51.01, 51.04, 57.91, 119/57.92, 51.11, 3, 5; 222/189, 394, 395; 239/654, 310, 8, 10, 142, 143; 406/135, 136, 146; 261/121.1, 121.2

[56] References Cited

U.S. PATENT DOCUMENTS

| | | | |
|---|---|---|---|
| 3,523,520 | 8/1970 | Evans | 119/51.04 |
| 3,528,588 | 9/1970 | Moore | 119/51.04 X |
| 3,874,340 | 4/1975 | Lemond et al. | 119/51.04 |
| 4,089,299 | 5/1978 | Suchowski | 119/51.04 |
| 4,237,820 | 9/1980 | Müller | 119/51.04 |
| 4,372,252 | 2/1983 | Lowry, Jr. | 119/51.04 |
| 4,492,182 | 1/1985 | Wensman et al. | 119/51.04 |
| 4,949,674 | 8/1990 | Young | 119/51.04 |
| 4,984,536 | 1/1991 | Powell et al. | 119/51.04 |
| 5,003,925 | 4/1991 | Roberts | 119/51.04 |

Primary Examiner—Gene Mancene
Assistant Examiner—Thomas Price
Attorney, Agent, or Firm—Richard C. Litman

[57] ABSTRACT

A fish feeding apparatus for disbursing fish food within one or more fish tanks. The apparatus includes a food canister having an opening which is sealed by a removable cap, an array of apertures from which fish food is disbursed, a suction device which enables the food canister to be affixed to an inside surface of a fish tank, and an inlet port whereby a fluid flow is permitted to enter. The apparatus further includes a pump having an outlet port whereby fluid flow is permitted to exit and a section of tubing connected at one end to the outlet port of the pump and at the opposite end connected to the inlet port of the food canister. The cap is removable to exposed the opening in the food canister where large aggregates of fish food, such as flakes or frozen cubes, are inserted. With the cap replaced the food canister is mounted in the fish tank with the array of apertures submerged below the water level. The pump is activated by a power source producing a fluid flow into and through the tubing and further into and through the food canister. This fluid flow creates a turbulent action within the food canister which reduces the large aggregates of fish food to smaller gradations of fish food particles which are disbursed through the array of apertures. This array of apertures permits only the smaller gradations of fish food particles to pass and retains the large aggregates of fish food.

18 Claims, 2 Drawing Sheets

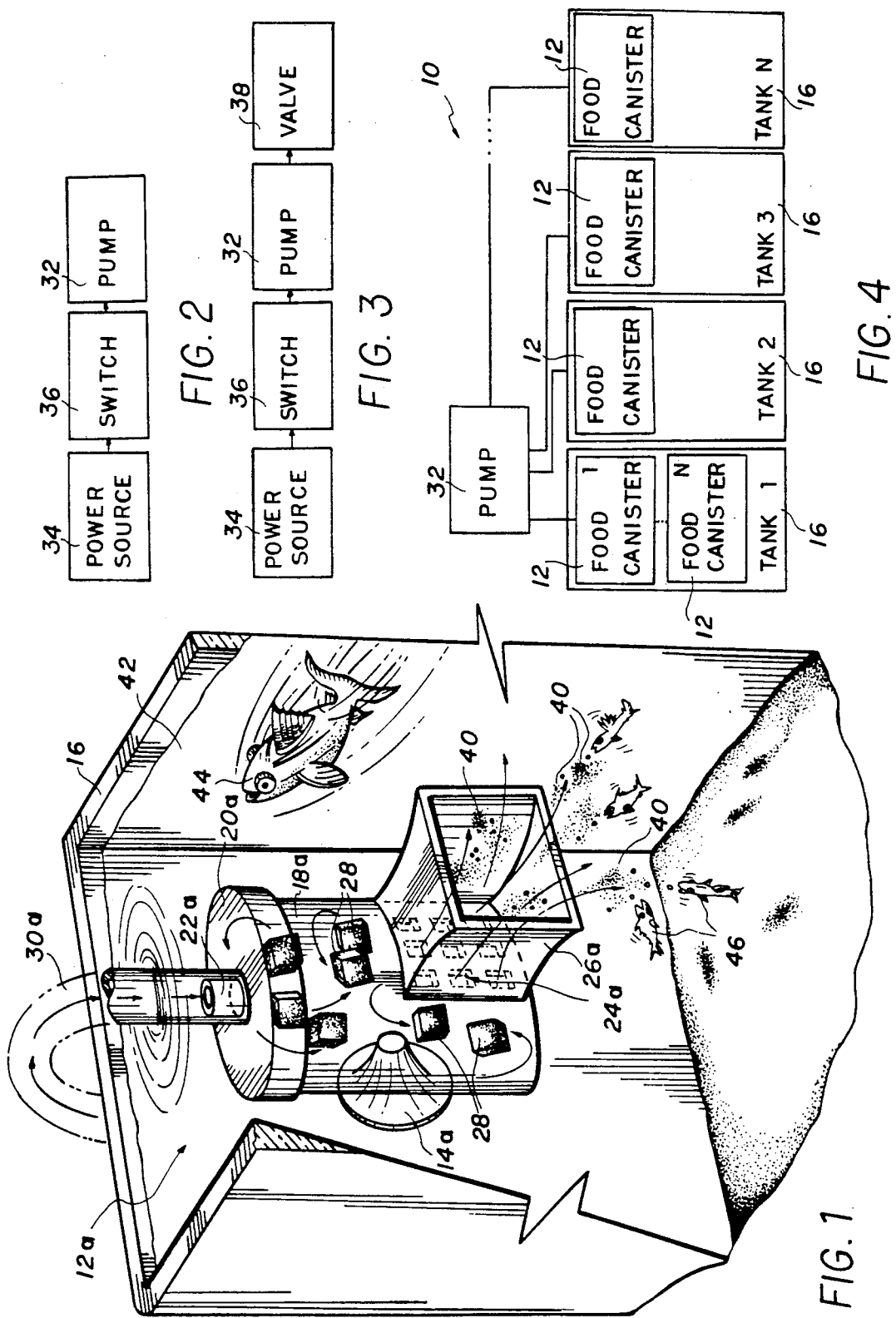

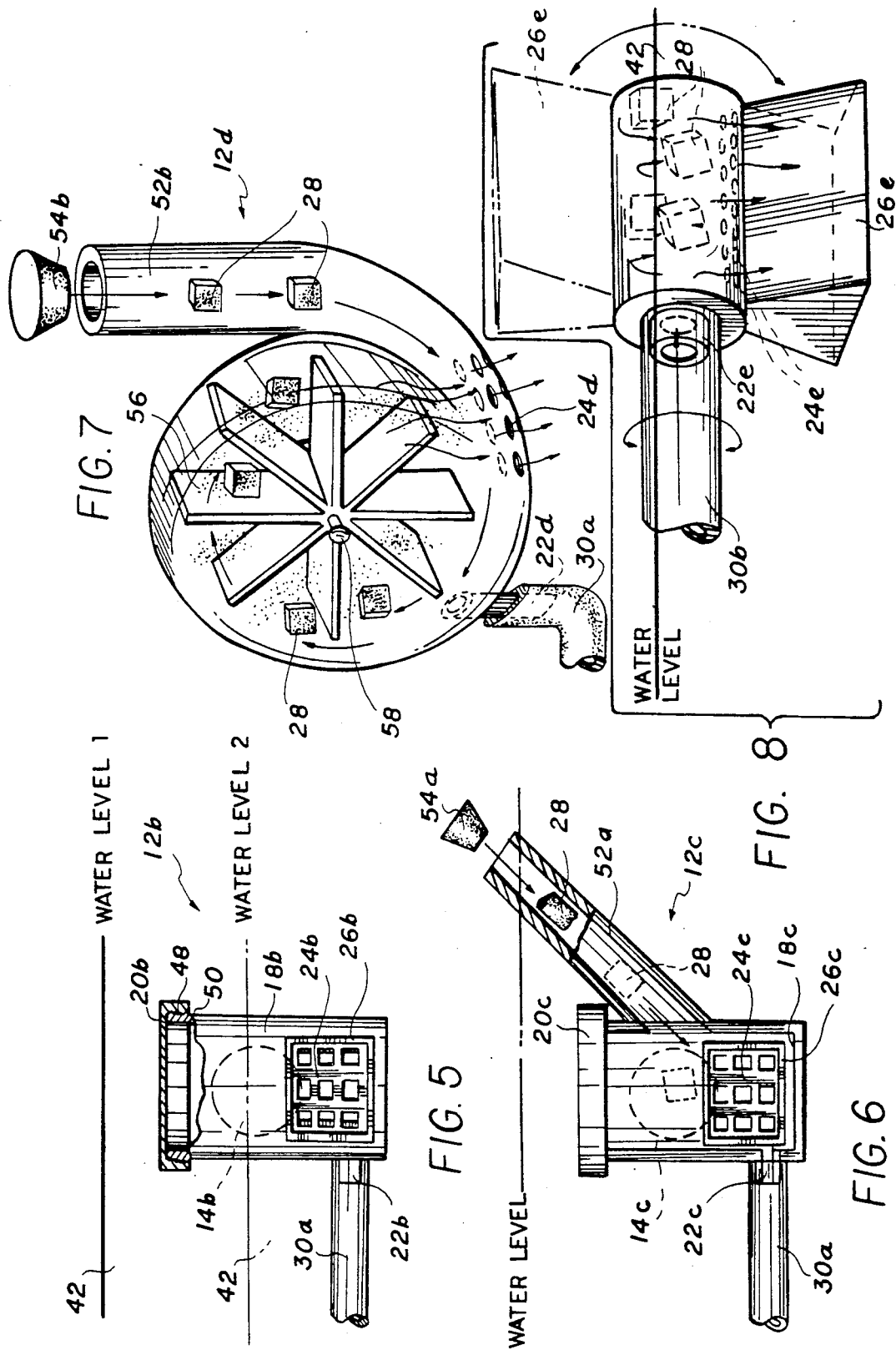

1

FISH FEEDING APPARATUS

BACKGROUND OF THE INVENTION

1. Field of the Invention

The present invention relates to an apparatus for disbursing fish food to a variety of fish in one or more fish tanks.

2. Description of Prior Art

The health of fish is dependent on numerous variables. In a controlled environment, such as an aquarium or a hatchery, it is important that these variables be met to provide living conditions sufficient for the fish to live healthy lives. The feeding of the fish is a prime constituent to their survival. Merely supplying fish food to the fish tank is often not adequate. For instance, when fish food, such as cubes or flakes, are dropped into a fish tank, the larger, more aggressive fish have a tendency to monopolize the fish food. This results in a gluttonous feeding of the larger, more aggressive fish and the undernourishment of smaller, less aggressive fish, both of which are unhealthy conditions. To insure that the less aggressive fish receive adequate provisions, the supplying of fish food is continued until the larger, more aggressive fish stop eating. This involves the ingestion of substantially more fish food than necessary for the larger, more aggressive fish, still an unhealthy condition. An apparatus which would dispense the necessary amount of fish food to all of the fish, reducing the risk of overfeeding or underfeeding would provide a healthier conditions for the all of the fish and would produce economic benefit for the user.

U.S. Pat. No. 3,874,340 issued Apr. 1, 1975 to Robert H. Lemond et al. discloses an air actuated automatic fish tank feeding system.

U.S. Pat. No. 4,089,299 issued May 16, 1978 to Bernard Suchowski shows an air-operated fish feeder in which fish food is periodically deposited into an aquarium.

U.S. Pat. No. 4,492,182 issued Jan. 8, 1985 to Gunner Wensman et al. discloses a method and device for feeding fish including the transfer of fish food from a central food store to a plurality of feed locations.

U.S. Pat. No. 4,949,674 issued Aug. 21, 1990 to Richard Young shows an automatic fish food dispenser allowing an outflow of fish food to a fish tank.

U.S. Pat. No. 4,984,536 issued Jan. 15, 1991 to James W. Powell et al. discloses an apparatus for directing a predetermined and measured quantity of food to be distributed to a fish pond.

U.S. Pat. No. 5,003,925 issued Apr. 2, 1991 to John D. Roberts shows a fish food dispenser for mounting on a fish tank for dispensing preset quantities of dry fish food onto the surface of the water.

None of the above inventions and patents, taken either singly or in combination, is seen to describe the instant invention as claimed.

SUMMARY OF THE INVENTION

The present invention provides a fish feeding apparatus for feeding fish, particularly for the uniformed feeding of a variety of fish. The fish feeding apparatus includes a food canister which is placed in the fish tank inhabited by the fish and is either completely or partially submerged within the water. The food canister is secured within the fish tank by a releasable fastening device, such as a suction cup, fixed to the food canister permitting the food canister to be fastened to an inside surface of the fish tank. Large aggregates of fish food, such as frozen cubes or flakes, are placed within the food canister. An inlet port permits fluid to flow into the food canister creating a turbulent water action in the food canister which reduces the larger aggregates of fish food to smaller gradations of fish food particles which are disbursed into the fish tank through an array of apertures provided in the food canister. A chute is transversely attached to the food canister surrounding the array of apertures functioning to direct the fluid flow away from the food canister with a force sufficient as to prevent the fish from swimming up to the array of apertures while at the same time stirring the water and circulating the fish food throughout the fish tank. This reduces the risk of the fish food being monopolized by the larger, more aggressive fish. The fluid flow is generated by a pump, such as an air pump or a water pump. The pump is operable via a power source which can be controlled by a switch to interrupt the current supplied to the pump. The fluid flow is regulated by a valve provided series between the pump and the inlet port of the food canister.

Accordingly, one object of the present invention is to provide a fish feeding apparatus which reduces large aggregates of fish food, such as frozen cubes or flakes, into a smaller gradations of fish food particles.

Another object of the invention is to provide an apparatus for dispensing smaller gradations of fish food particles uniformly to both larger, more aggressive fish as well as smaller, less aggressive fish, reducing the risk of overfeeding the larger, more aggressive fish or underfeeding the smaller, less aggressive fish.

A further object of the present invention is to provide a fish feeding apparatus which can be used with existing pumps.

These and other objects of the present invention will become readily apparent upon further review of the following specification and drawings.

BRIEF DESCRIPTION OF THE DRAWINGS

FIG. 1 is an environmental perspective view showing the present invention in use;

FIG. 2 is a block diagram showing the pump of the present invention used in combination with a power source controlled by a switch;

FIG. 3 is a block diagram showing the pump of the present invention used in combination with both a valve to regulate the fluid flow and a power source controlled by a switch;

FIG. 4 is a block diagram showing a plurality of food canisters according to the present invention used in combination with a plurality of fish tanks, each tank containing at least one food canister.

FIG. 5 is a side elevational view showing the present invention either totally submerged or partially submerged leaving the cap exposed above the water level.

FIG. 6 is a side elevational view showing the present invention with the food canister completely submerged and an adjoining funnel exposed above the water level whereby the food canister is filled.

FIG. 7 is a side perspective view showing the present invention including a funnel and a mechanical agitator driven by the fluid flow.

FIG. 8 is a side perspective view of the present invention including a rotatably attached food canister which enables the direction of the array of apertures surrounded by a chute to be altered.

Similar reference characters denote corresponding features consistently throughout the attached drawings.

DETAILED DESCRIPTION OF THE PREFERRED EMBODIMENTS

Now referring to the drawings, FIGS. 1-4 illustrate the food canister 12a mounted via a fastener 14a, such as suction cup, to an inside surface of a fish tank 16 below the water level. The food canister includes a body 18a, a cap 20a, an inlet port 22a, an array of apertures 24a, and a chute 26a surrounding the array of apertures 24a. Large aggregates of fish food 28, such as flakes or frozen cubes, are contained within the food canister 12a. Fluid, such as air or water, is permitted to flow into the inlet port 22a through a tube 28 having two ends, a first end of the tube 30a connected to a pump 32 and a second end of the tube 30a connected to the inlet port 22a of the food canister 12a. The pump 32 is made operable by a power source 34 which is enabled or disabled through a control device such as a switch 36. The fluid flow from the pump 32 to the food canister 12a is regulated by a valve 38. With the pump 32 operable and the valve 38 in an open position to allow fluid to flow into and through the food canister 12a, a turbulence is created within the food canister 12a which reduces the larger aggregates of fish food 28 to smaller gradations of fish food particles 40 and disburses the smaller gradations of fish food particles 40 into the water 42 through the array of apertures 24a. This array of apertures 24a restricts the discharge to the smaller gradations of fish food particles 40 and does not permit the larger aggregates of fish food 28 to be disbursed. The chute 26a surrounding the array of apertures 24a further restricts the fluid flow to through a predetermined area within the chute 26a which creates an increase in the velocity of the fluid flowing through and exiting from the chute 26a. With sufficient fluid flowing from the pump 32, the velocity of the fluid exiting the chute 26a is substantial enough to prevent the larger, more aggressive fish 44 from approaching the array of apertures 24a, thus reducing the risk of the larger, more aggressive fish 44 from monopolizing the smaller gradations of fish food particles 40 being disbursed. Moreover, with the food canister 12a positioned properly in the fish tank 16, the fluid flowing from the chute 26a creates a stirring effect of the water 42 within the fish tank 16 providing a uniformed distribution of smaller gradations of fish food particles 40. This uniformed distribution of smaller gradations of fish food particles 40 further enhances the opportunity for the smaller less aggressive fish 40 to feed.

As shown in FIG. 5, the cap 20b is threadably attached. The male threads 48 adjacent the top of the body 18b which mates with the female threads 50 of the cap 20b. The removal of the cap 20b permits the food canister 12b to be filled. The food canister 12b can be either totally submerged in the water 42 or partially submerged to expose the cap 20b. With the cap 20b exposed above the water 42, it is less cumbersome to fill the food canister 12b. The inlet port 22b is located on the body 18b opposed to the cap 20a providing even greater ease in refilling the food canister 18b.

FIG. 6 shows a food canister 12c provided with a funnel 52a which allows the food canister 12c to be filled with the body 18c completely submerged in the water 42. A plug 54a is provided to close the end of the funnel 52a so as not to permit fluid to escape from the food canister 12c through the funnel 52a when the fish feeding apparatus is in use.

FIG. 7 illustrates a food canister 12d which includes a mechanical agitator 56, such as a paddle wheel, rotatably mounted on an axis 58 which is fixed within the food canister 12d. The mechanical agitator 56 is driven by the force of the fluid flow entering through the inlet port 22d.

FIG. 8 shows a food canister 12e being pivotably connected to a first end of a rigid tube 30b to provide a snug fit configuration; a second end of the rigid tube 30b is connected to the pump 32 (not shown). This pivotal connection enables the array of apertures 24e, the chute 26e, and furthermore, the fluid flow to be directed where desired. With the food canister 12e partially submerged, the food canister 12e is rotated to direct the chute 26e downward into the water 42. When the feeding is complete, the food canister is rotated to direct the chute 26e upward away from the water 42.

It is to be understood that the present invention is not limited to the embodiments described above, but encompasses any and all embodiments within the scope of the following claims.

I claim:

1. A fish feeding apparatus that disburses fish food within a fish tank means containing water, said apparatus comprising:
    (a) a food canister containing large aggregates of fish food therein and disburses smaller gradations of fish food particles therefrom into the water;
    (b) means for filling said food canister with the large aggregates of fish food;
    (c) means for disbursing the smaller gradations of fish food particles from said food canister into the water;
    (d) fastening means mounting said food canister within the fish tank means;
    (e) a pump means to provide a supply of fluid flow; and
    (f) means to connect said pump means to said food canister, whereby said food canister is filled with the large aggregates of fish food, said pump supplies said fluid flow to said food canister which creates a turbulence within said food canister which reduces the large aggregates of fish food to smaller gradations of fish food particles, and the smaller gradations of fish food particles are disbursed into the water.

2. The apparatus according to claim 1, wherein a mechanical agitator means is rotatably attached within said food canister which physically agitates the large aggregates of fish food contained within said food canister.

3. The apparatus according to claim 2, wherein mechanical agitator means includes a paddle wheel means.

4. The apparatus according to claim 1, further comprises an opening in said food canister concealed by a cap member, whereby said cap member is removable to expose said opening whereby the large aggregates of fish food are inserted in and through said opening into said food canister providing said means for filling said food canister.

5. The apparatus according to claim 1, wherein a funnel means has a first end connected to a passage to said food canister and a second end which extends above the water when said food canister is mounted within the fish tank means, whereby the fish food is inserted into and through said funnel means into said food canister providing said means for filling said food canister.

6. The apparatus according to claim 5, wherein a plug means is provided to plug said second end of said funnel means to restrict fluid flow through said funnel means when said fish feeding apparatus is in use.

7. The apparatus according to claim 1, wherein an aperture small enough to contain the large aggregate of fish food and large enough to enable the passage of the smaller gradations of fish food particles provides said means to disburse said fish food.

8. The apparatus according to claim 1, wherein an array of apertures, each aperture being small enough to contain the large aggregates of fish food and large enough to enable the passage of the smaller gradations of fish food particles provides said means to disburse said fish food.

9. The apparatus according to claim 1, wherein a chute is provided in combination with said means to disburse the fish food and is fastened transversely to an outside surface of said food canister to provide a means to direct fluid flow from said means to disburse said smaller gradations of fish food particles.

10. The apparatus according to claim 9, further comprising means for mounting said food canister on an end of a pump outlet and being partially submerged in the water, whereby said food canister is rotated to direct said chute upward above the water when said food canister is not in use and is rotated to direct said chute downward into the water when said food canister is in use.

11. The apparatus according to claim 1, further comprising a suction means on said food canister, whereby said suction means forms a suction against an inside surface of the fish tank providing a fastening means to secure said food canister within the fish tank.

12. The apparatus according to claim 1, wherein an outlet port and a means for attaching a first end of a tube thereon is provided on said pump means, an inlet port and a means for attaching a second end of said tube thereon is provided on said food canister, and said tube is provided having said first end connected to said outlet port of said pump means and having said second end connected to said inlet port of said food canister providing said means to connect said pump means to said food canister.

13. The apparatus according to claim 1, further comprising a power source and a means for connecting said power source to said pump means.

14. The apparatus according to claim 13, further comprising switching means for enabling and disabling a current flow from said power source to said pump means.

15. The apparatus according to claim 1, further comprising regulating means for controlling fluid flow from said pump means.

16. A fish feeding apparatus within a conventional water filled fish tank including a pump, said apparatus comprising:
    (a) a food canister containing large aggregates of fish food therein and disburses smaller gradations of fish food particles therefrom into the water;
    (b) means for filling said food canister with the large aggregates of fish food;
    (c) means for disbursing the smaller gradations of fish food particles from said food canister into the water;
    (d) fastening means mounting said food canister within the fish tank; and
    (e) means to connect the pump to said food canister, whereby upon filling of said food canister with the large aggregates of fish food, the pump supplies said fluid flow to said food canister which creates a turbulence within said food canister which reduces the large aggregates of fish food to smaller gradations of fish food particles, and the smaller gradations of fish food particles are disbursed into the water.

17. The apparatus according to claim 1, wherein said means for filling said food canister comprise means defining an opening in said food canister concealed by a cap member, said cap member being removable to expose said opening, whereby the large aggregates of fish food are inserted in and through said opening into said food canister.

18. The apparatus according to claim 1, wherein said means for disbursing the smaller gradations of fish food comprise an array of apertures in combination with a chute fastened transversely to an outside surface of said food canister, each aperture being small enough to contain the large aggregates of fish food and large enough to enable the passage of the smaller gradations of fish food particles, said chute further providing a means to direct fluid flow from said apertures.

* * * * *